Dec. 13, 1960 W. J. MORROW ET AL 2,964,720
TUNABLE DETECTOR MOUNT
Filed March 3, 1960
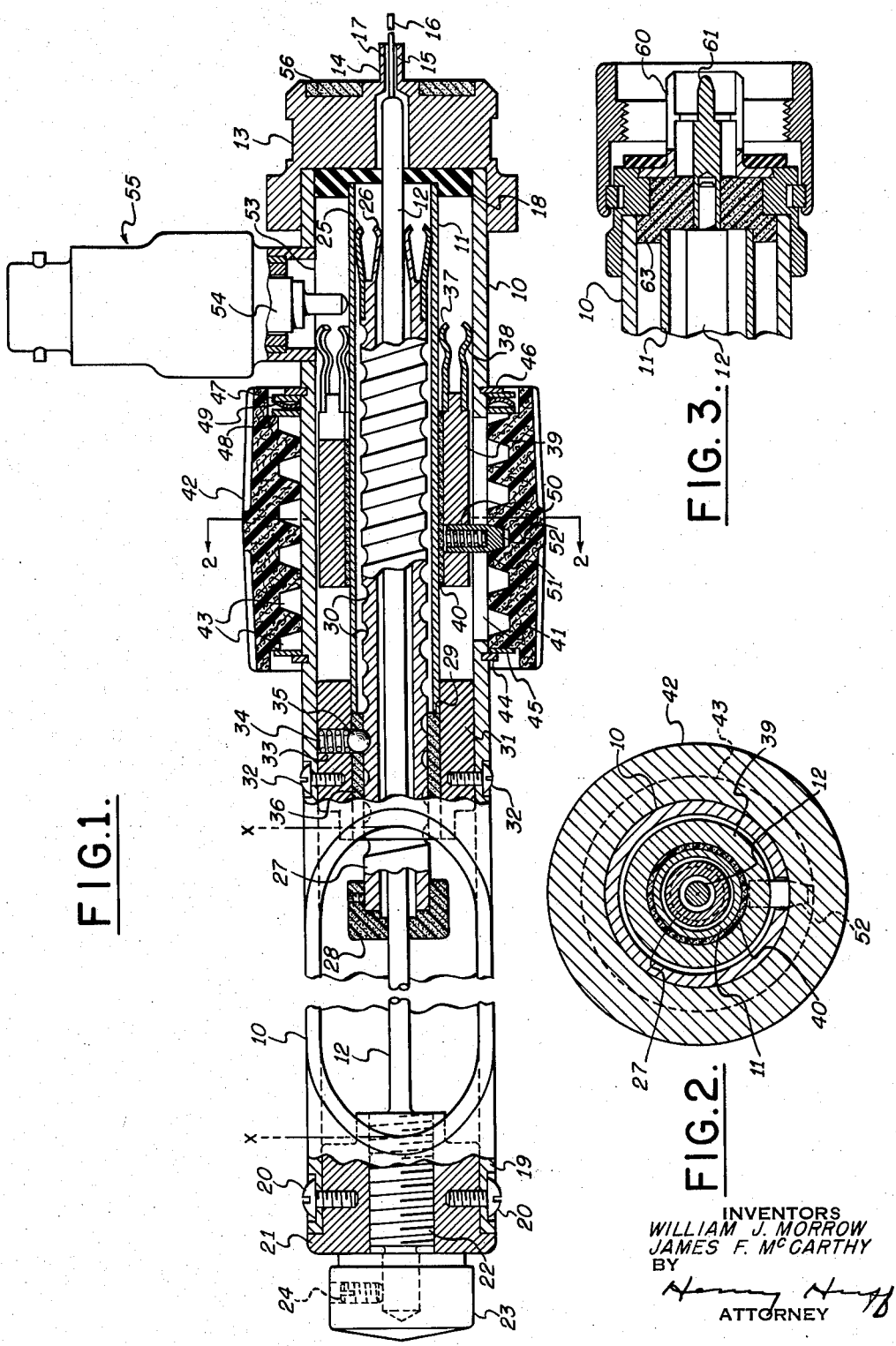
INVENTORS
WILLIAM J. MORROW
JAMES F. McCARTHY
BY
ATTORNEY

United States Patent Office 2,964,720
Patented Dec. 13, 1960

2,964,720
TUNABLE DETECTOR MOUNT

William J. Morrow and James F. McCarthy, St. Petersburg, Fla., assignors to Sperry Rand Corporation, Great Neck, N.Y., a corporation of Delaware Filed Mar. 3, 1960, Ser. No. 12,590
6 Claims. (Cl. 333—97)

This invention relates to tunable detector mounts and to means for easily and accurately tuning a detector mount of the type comprised of two concentric coaxial transmission line stubs.

Tunable detector mounts are fundamental components in many types of electromagnetic wave measuring equipment used extensively in electronic measurements laboratories. As one example, they are used to match a detector to a probe which is inserted into the electric field within a slotted transmission line to determine the characteristics of the waves propagating within the slotted transmission line. This device, an impedance meter, is a basic microwave measurement tool and the ultimate utility and commercial success of such a device, as well as other devices using tunable detector mounts, are largely determined by the ease, accuracy and repeatability of tuning. Additionally, the response of the measuring device should not be altered by the mechanical wear of its physical parts. Coupled with these factors is the practical consideration that the device must be simple and economical to construct.

The device of this invention is a tunable detector mount comprised of two concentric coaxial transmission line stubs which are independently tunable and which incorporates all of the above-mentioned features to a degree not found in other available devices. Some of the objectionable features found in other known similar devices are that the adjustable tuning mechanisms are subject to backlash which results in jerky movements and causes exact adjustment to be most tedious. Additionally, in similar known devices there is a tendency for the relatively movable parts to stick or bind, again causing erratic and jerky movement of the tuning means.

It is therefore an object of this invention to provide a tunable detector mount which is easily and accurately tunable.

Another object of this invention is to provide a double-tuned detector mount in which exact and repeatable adjustments are easily obtained.

A further object of this invention is to provide accurate and smooth tuning of each of two coaxial stub lines concentric with respect to each other.

Another object of this invention is to provide an accurate and a simply operating coarse and fine tuning adjustment of a tunable detector mount.

Another object of this invention is to provide independent movement of each of two short circuits associated, respectively, with first and second concentric coaxial stub lines, wherein the movement of each of said shorts is substantially free from backlash and binding.

It is a further object of this invention to provide a simple and economical tunable detector mount.

These and other objects and advantages of this invention will become more evident from the specification and claims below, which will be explained in connection with the accompanying drawings wherein:

Fig. 1 is a longitudinal cross section view of the tunable detector mount of this invention employed with an electrical probe;

Fig. 2 is a transverse sectional view taken at section 2—2 of Fig. 1; and

Fig. 3 is a partial longitudinal cross section view illustrating a different type of input connection to the tunable detector mount illustrated in Fig. 1.

Referring now to Fig. 1, the tuner is comprised of first and second concentric coaxial stub lines wherein tubular conductors 10 and 11 respectively form the outer and inner conductors of the outer coaxial line section, and tubular conductor 11 and conductive central rod 12 respectively form the outer and inner conductors of the inner coaxial line section. An annular collar 13 of a conductive material is fixed to the right end of the outermost conductor 10 and terminates in stub 14 having a central aperture 15 of smaller diameter than the diameter of tubular conductor 10. A rigid wire probe 16 of a highly conductive material is fixed to the right end of rod 12 and extends through central aperture 15. Probe 16 preferably is soft soldered to rod 12 in order to facilitate its replacement in the event that it should accidentally become bent. Probe tip 16 and the right end of rod 12, together with annular collar 13 and stub 14, respectively comprise the inner and outer conductors of a third coaxial line section through which energy extracted by probe 16 is coupled into the tunable detector mount comprised of the concentric coaxial stub lines just described.

A sleeve 17 of a low loss dielectric material separates and supports probe 16 within the central aperture 15, and an annular washer 18 of a similar dielectric material supports and separates tubular conductor 11 from the outermost tubular conductor 10. Tubular conductor 11 is spaced axially from the inner end of annular collar 13 by said dielectric annular washer 18.

Outermost conductor 10 constitutes the outer housing for the detector mount and terminates at its left end in a short tubular section 19. Throughout the region designated X—X, outer conductor 10 is cut away at diametrically opposite longitudinally extending regions to provide free access to its interior. The terminating tubular section 19 is fixed by means of screws 20 to threaded nut 21. Nut 21 threadably engages an end stud 22, which in turn is secured to the left end of central rod 12. Upon rotation of knob 23, secured to threaded end stud 22 by set screw 24, the central rod 12 is moved axially and provides means for adjusting the depth of insertion of probe 16 into a slotted transmission line.

Returning now to the two concentric coaxial stub lines, the inner coaxial line comprised of rod 12 and tubular conductor 11 is short-circuited by conductive spring contact fingers 25 and 26 which extend coaxially between rod 12 and tubular conductor 11. The left end of the spring contact fingers 25 and 26 are secured to the end of tubular member 27 which extends coaxially between rod 12 and tubular conductor 11 in the direction away from the third coaxial line section comprised of rod 12, probe 16 and end collar 13. Tubular member 27 is threaded around its exterior surface with a screw thread 30 having a rounded cross section less than a semi-circle. Threaded tubular member 27 is fixed at its left end to an annular knob 28 which is free to move axially and rotationally between outer conductor 10 and central rod 12. Annular knob 28 is made from a material known as "Nylatron GS," a mixture of nylon and molybdenum di-sulphide, sold by Polymer Corporation, Reading, Pennsylvania. The molybdenum di-sulphide acts as a dry lubricant so that the material will provide an excellent bearing surface. Rod 12 extends through annular knob 28 and is supported thereby. Because of the properties of the above-mentioned material, annular knob 28 affords a low-friction, self lubricating bearing for axial and rotational relative movement between rod 12 and knob 28. Inner tubular conductor 11 terminates at its left end at 29. An annular sleeve 31 is fixed between outer tubular conductor 10 and inner tubular conductor 11 by screws 32. A hole 33 is bored into annular sleeve 31 and receives a spring 34 and ball detent 35 whose radius is very slightly less than the radius of curvature of the rounded screw thread 30. Ball detent 35 is urged radially into contact with the threaded surface of threaded tubular member 27 by a sufficient force to releasably hold threaded tubular member 27 against axial movement when ball detent 35 is in the screw thread 30.

Knob 28, secured to threaded tubular member 27, provides means for axially positioning said threaded member 27, and upon the application thereto of an axial force exceeding a predetermined magnitude, determined primarily by the friction caused by spring contact fingers 25 and 26 and the radial force of ball detent 35, ball detent 35 is forced upwardly out of the rounded screw thread and rides over the screw threads in threaded member 27, thus allowing axial movement of threaded tubular member 27 and providing a coarse axial positioning of the short-circuiting spring contact fingers 25 and 26. Upon rotation of knob 28, ball detent 35 acts as a thread follower following along screw thread 30, thus providing a fine axial positioning of spring contact fingers 25 and 26. Backlash and play between spring contact fingers 25, 26 and the conductors 12, 11 of the inner coaxial line are substantially eliminated by close tolerance between the radius of ball detent 35 and the radius of curvature of screw thread 30 and the radius of hole 33, in conjunction with the radial force exerted by ball detent 35 in the screw thread 30. Bushing 36 is secured to annular sleeve 31 and fits relatively closely around threaded tubular member 27 thereby preventing radial displacement of said threaded tubular member 27. Bushing 36 is made from the above-mentioned "Nylatron GS" material and provides a self-lubricating low-friction bearing around threaded tubular member 27.

The outer one of the concentric coaxial lines, comprised of tubular conductors 10 and 11, is tunable by means of axially movable short-circuiting spring contact fingers 37 and 38 which extend coaxially between conductors 10 and 11. Spring contact fingers 37 and 38 are secured at their left ends to the end of an axially-movable short tubular member 39 disposed coaxially between conductors 10 and 11 and extending axially in the direction away from probe 16. Secured to the interior surface of short tubular member 39 is a bushing sleeve 40 of the above described "Nylatron GS" material.

An axially extending slot 41 is cut through the outer conductor 10, and coaxially positioned about outer conductor 10 in the region of said slot 41 is an internally threaded barrel 42. Barrel 42 is molded from the above-described "Nylatron GS" material and has an acme screw thread 43 formed therein. A restraining ring 44 and washer 45 prevent leftwardly axial movement of barrel 42. At the right end of barrel 42, a restraining ring 46, and a wave washer 49 positioned between annular washers 47 and 48 restrain barrel 42 against axial movement.

A hole 50 through short tubular member 39 houses a spring 51 and a thread follower, or plunger, 52 which is urged radially outwardly through axial slot 41 into contact with the acme screw thread 43. Thread follower 52 has a complementary shape to the acme screw thread and its sloping flanks make a positive contact with the sloping flanks of the screw thread. Upon rotation of barrel 42, spring biased thread follower 52 follows along the internal screw thread 43 and moves short tubular member 39 and spring contact fingers 37 and 38 axially between outer and inner conductors 10 and 11, thus varying the tuning of the outer coaxial stub line. The molded "Nylatron GS" barrel allows for self-lubricating, low-friction contact with thread follower 52, and with the washers 45 and 48 at each end thereof.

Spring 51 presses against the bushing sleeve 40 and causes said sleeve 40 to make a positive contact along the length of inner tubular conductor 11. This prevents rocking of the short tubular member 39 and thus prevents any jitter or displacement of spring contact fingers 37 and 38 except for the purely axial movement which results from the rotation of barrel 42. The feature of bushing sleeve 40 being spring-biased into positive contact with inner tubular conductor additionally eliminates the need for close mechanical tolerance between those members, thus reducing the cost and complexity of manufacture of those members. Close tolerance between thread follower 52 and hole 50, and positive contact between spring-loaded thread follower 52 and screw thread 43 prevents any backlash in the outer coaxial line tuner. Any physical wear which might occur between the flanks of thread follower 52 and the flanks of screw thread 43 will not give rise to backlash in the outer coaxial line tuner because the sloping flanks of the thread follower 52 will still be urged radially into positive contact with the sloping flanks of the screw thread 43. To assure this feature, the crown of thread follower 52 should be displaced from the root of screw thread 43 when they are spring-biased into their positive contact.

An aperture 53 is located in the outer tubular conductor 10 to the right of rotatable barrel 42, and a detector 54, a crystal for example, and its associated housing indicated generally at 55, are arranged in the well known manner to coupled energy from the outer coaxial line comprised of tubular conductors 10 and 11 to an indicator, not shown.

In the operation of the double-tuned detector just described, the detector assembly illustrated in Fig. 1 will be mounted on a movable carriage and the probe 16 will be inserted through the slot in a transmission line. A washer 56 of a material dissipative to microwave energy, such as polyiron, is recessed into annular collar 13 to prevent radiation of microwave energy which couples out of the slotted transmission line. The operator first will take hold of knob 28 and move it axially causing ball detent 35 to ride over rounded screw threads 30 to obtain a coarse tuning of the inner coaxial line comprised of rod 12 and inner tubular conductor 11. Next the operator will rotate knob 28, causing ball detent 35 to follow in screw threads 30 to obtain a fine tuning of the inner coaxial stub line. Knob 23 at the left end of Fig. 1 may have to be rotated to adjust the depth of insertion of probe 16 in order to obtain an indication in the desired range of the indicator, a meter for instance. Next, barrel 42 is rotated to tune the outer coaxial line section comprised of outer tubular conductor 10 and inner tubular conductor 11. Further fine adjustment of knob 28 and the barrel 42 may then be made to compensate for the mutual effect which the individual tuners have on the resultant tuning of the detector mount. A tunable detector mount and probe constructed substantially as illustrated in Fig. 1 operated successfully over the frequency range of 850 to 18,500 mc., was smoothly tunable, and free from any backlash, play or sticking in its mechanical movement.

The tunable detector mount of this invention may be used with equipment other than the electrical probe for a standing wave detector which is illustrated in Fig. 1. As an example, the electric probe 16 of Fig. 1 may be replaced by a type N coaxial line connector for direct connection to a section of coaxial transmission line. This type of an arrangement is illustrated in Fig. 3, wherein the outer conductor 60 of the type N connector is conductively connected to tubular conductor 10 of the outer stub line of the tunable detector mount and the inner conductor 61 of the connector is conductively connected to central rod 12 by means of a polarized coupling joint. A washer 63 of low loss dielectric material supports the joined center conductors 12 and 61 and maintains them in alignment with respect to outer tubular conductor 10 and inner tubular conductor 11. The remainder of the coupling joint is constructed in accordance with standard practices and need not be further explained.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A tunable detector mount comprising first and second concentric coaxial transmission lines, the outer conductor of the inner one of said lines being the inner conductor of the outer one of said lines, the outermost conductor and the innermost conductor of said two concentric coaxial lines extending axially beyond one end of the conductor common to said two lines and thereby comprising a third coaxial line section, a first axially movable short circuiting means coaxially disposed between the conductors of the inner one of said concentric lines, an elongated tubular member fixed at one end to said short circuiting means and extending in a direction away from said third coaxial line, said tubular member being threaded on its exterior surface throughout at least a portion of its length with screw threads having a rounded cross section, a ball detent axially fixed with respect to the conductors of the outer of said lines and radially spring biased into contact with the threaded surface of said threaded tubular member, said ball detent being urged radially with a sufficient force to releasably hold said threaded member against axial movement when said detent is in said rounded screw thread, said spring-biased detent being adapted to ride over said screw threads upon the application to said threaded tubular member of an axial force exceeding a predetermined magnitude to provide coarse axial positioning of said first short circuiting means and adapted to follow in said screw thread upon the application to said threaded tubular member of a rotational force to provide fine axial positioning of said first short circuiting means, second axially movable short circuiting means coaxially disposed between the conductors of the outer one of said concentric coaxial lines, an elongated hollow barrel coaxially and rotatably disposed around the outer one of said concentric coaxial lines and being axially fixed with respect thereto, said hollow barrel being internally threaded with a screw thread having sloping flanks, the outer conductor of the outer one of said concentric coaxial lines having an axially extending slot in the region occupied by said hollow barrel, a hollow tubular member fixed at one end to said second short circuiting means and extending in a direction away from said third coaxial line, a spring-biased thread follower carried by and axially fixed with respect to said last-named tubular member and extending radially outwardly through said slot to slidably engage the screw thread in said hollow barrel, whereby the rotation of said hollow barrel causes axial movement of said second short circuiting means, said thread follower having a complementary shape to said screw thread and the crest of said thread follower being displaced from the root of said screw thread, whereby said spring-biased follower positively engages the sloping flanks of the screw thread in said hollow barrel and also urges the hollow tubular member fixed to said second short circuiting means into a positive non-rocking contact with the common conductor of said concentric coaxial lines, and electromagnetic wave detecting means electrically coupled to the outer one of said concentric coaxial lines at a region between said hollow barrel and said third coaxial line section.

2. The combination claimed in claim 1 wherein the center conductor of the inner one of said concentric coaxial lines is axially movable with respect to the other conductors of said concentric coaxial lines, and further including a rigid conductive probe fixed to the end of said last-named center conductor and adapted to be inserted into the field of an electromagnetic wave propagating along a transmission line.

3. The combination claimed in claim 1 including coaxial line connecting means connected to said third coaxial line section for coupling said tunable detector mount directly to an external coaxial line section.

4. A tunable detector mount comprising first and second concentric coaxial transmission lines, the outer conductor of the inner one of said coaxial lines being the inner conductor of the outer one of said coaxial lines, the outermost conductor and the innermost conductor of said two concentric coaxial lines extending axially beyond one end of the conductor common to said two lines and thereby comprising a third coaxial line section, first and second axially movable short circuiting means coaxially disposed, respectively, between the conductors of the first and second concentric coaxial transmission lines, an elongated tubular member fixed at one end to said first short circuiting means and extending coaxially between the conductors of said first coaxial line in a direction away from said third coaxial line section, said tubular member being threaded on its exterior surface with screw threads having a rounded cross section, a ball detent axially fixed with respect to the conductors of the second of said coaxial lines and radially spring biased into contact with the threaded surface of said threaded tubular member, said ball detent being urged radially with a sufficient force to releasably hold said threaded member against axial movement when said detent is in said rounded screw thread, said spring-biased detent being adapted to ride over said screw threads upon the application to said threaded tubular member of an axial force exceeding a predetermined magnitude to provide coarse axial positioning of said first short circuiting means and adapted to follow in said screw thread upon the application of a rotational force to said threaded tubular member to provide fine positioning of said first short circuiting means, a closely fitting elongated hollow barrel coaxially and rotatably disposed around the outer conductor of said second coaxial line and being axially fixed with respect thereto, said hollow barrel being internally threaded with a screw thread having sloping flanks, said outer conductor of said second coaxial line having an elongated slot in the region occupied by said hollow barrel, a hollow tubular member fixed at one end to said second short circuiting means and extending between the conductors of said second coaxial line in a direction away from said third coaxial line, a rigid spring-biased thread follower carried by and axially fixed with respect to said last-named tubular member and extending radially outwardly through said slot to slidably engage said screw thread in said hollow barrel, said thread follower having a complementary shape to said screw thread and being urged into positive contact with the flanks of said screw thread, said spring-biased thread follower also urging said last-named tubular member into a positive non-rocking contact with the inner conductor of said second coaxial line, and means for coupling an electromagnetic wave detecting means to said second coaxial line at a region between said hollow barrel and said third coaxial line section.

5. An electric probe for abstracting energy from an electromagnetic wave transmission line comprising an outer tubular conductor terminating at one end in a coaxial central aperture of substantially smaller diameter than said conductor, an inner tubular conductor coaxial with and of smaller diameter than said outer conductor, said inner conductor being fixed with respect to said outer conductor and axially spaced from said central aperture whereby said two conductors comprise a first coaxial line section, an elongated conductive rod coaxially disposed within said inner conductor and axially movable with respect thereto, said rod and said inner tubular conductor comprising a second coaxial line section concentric with said first line section, a rigid wire conductor connected to one end of said rod and extending through said central aperture, axially movable shorting means coaxially positioned between said inner tubular conductor and said rod, an axially extending tubular member fixed at one end to said shorting means and extending in a direction away from said central aperture, said last-named tubular member having screw threads of a rounded cross section less than a semicircle extending along its exterior surface, a spring-biased ball detent axially fixed with respect to said inner conductor and urged radially inwardly into contact with said threaded tubular member, said threaded tubular member being axially movable and coaxially rotatable with respect to said inner tubular conductor, said ball detent being urged into contact with said threaded tubular member with sufficient force to prevent axial or rotational movement of said member in the absence of an intentional displacement of said threaded member, said ball detent riding over the threads of said threaded tubular member upon axial displacement of said threaded tubular member to provide coarse axial positioning of said shorting means and following along the threads of said threaded member upon rotation thereof to provide fine axial positioning of said shorting means, a second axially movable shorting means coaxially positioned between said inner and outer tubular conductors, an elongated annular member disposed coaxially around said outer tubular conductor, said annular member being axially fixed but rotatable with respect to said outer tubular conductor, said annular member being internally threaded with a continuous screw thread having sloping flanks, a thread follower carried by said second shorting means and axially fixed with respect thereto and having a complementary shape to mate with the internal thread of said annular member, said outer conductor having an axially extending slot in the region of said annular member to permit the passage therethrough of said thread follower, said thread follower being radially spring biased into a slidable contact with said internal thread of said annular member whereby the rotation of said annular member moves said second shorting means longitudinally between said inner and outer tubular conductors.

6. Independently tunable double concentric coaxial transmission line stubs comprising first and second concentric coaxial transmission lines, the outer conductor of the inner one of said lines being the inner conductor of the outer one of said lines, a first axially movable short circuiting means coaxially disposed between the conductors of the inner one of said concentric lines, an elongated tubular member fixed at one end to said short circuiting means and extending in a direction away from said short circuiting means, said tubular member being threaded on its external surface throughout at least a portion of its length with screw threads having a rounded cross section, a ball detent axially fixed with respect to the conductors of the outer of said lines and radially spring-bias into contact with the threaded tubular member, said ball detent being urged radially with a sufficient force to releasably hold said threaded member against axial movement when said detent is in said rounded screw thread, said spring-biased detent being adapted to ride over said screw threads upon the application to said threaded tubular member of an axial force exceeding a predetermined magnitude to provide coarse axial positioning of said first short circuiting means and adapted to follow in said screw thread upon the application to said threaded tubular member of a rotational force to provide fine axial positioning of said first short circuiting means, a second axially movable short circuiting means coaxially disposed between the conductors of the outer one of said concentric lines, an annular member disposed coaxially around the outer conductor of the outer one of said lines, said annular member being axially fixed but rotatable with respect to said outer conductor, said annular member being internally threaded with a screw thread having sloping flanks, a thread follower carried by said second shorting means and axially fixed with respect thereto and having a shape to mate with the internal thread of said annular member, said outer conductor having an axially extending slot in the region of said annular member to permit the passage therethrough of said thread follower, said thread follower being radially spring biased into a slidable contact with said internal thread of said annular member whereby the rotation of said annular member moves said second shorting means longitudinally between the conductors of the outer one of said concentric lines.

No references cited.